(12) United States Patent
Dill et al.

(10) Patent No.: US 7,248,434 B2
(45) Date of Patent: Jul. 24, 2007

(54) PLANARIZED PERPENDICULAR POLE TIP SYSTEM AND METHOD FOR MANUFACTURING THE SAME

(75) Inventors: Frederick Hayes Dill, South Salem, NY (US); Jeffrey S. Lille, Sunnyvale, CA (US); Son Van Nguyen, San Jose, CA (US); Hugo Alberto Emilio Santini, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 427 days.

(21) Appl. No.: 10/798,163

(22) Filed: Mar. 10, 2004

(65) Prior Publication Data

US 2005/0201011 A1 Sep. 15, 2005

(51) Int. Cl.
*G11B 5/147* (2006.01)
(52) U.S. Cl. ..................................... 360/126
(58) Field of Classification Search ............... 360/125, 360/126
See application file for complete search history.

(56) References Cited

U.S. PATENT DOCUMENTS

| | | | | |
|---|---|---|---|---|
| 4,896,417 | A | 1/1990 | Sawada et al. | 29/603 |
| 5,658,470 | A | 8/1997 | Schultz et al. | 216/22 |
| 5,784,224 | A | 7/1998 | Rottmayer et al. | 360/113 |
| 5,820,770 | A * | 10/1998 | Cohen et al. | 216/22 |
| 5,835,315 | A * | 11/1998 | Cohen et al. | 360/126 |
| 6,073,338 | A | 6/2000 | Liu et al. | 29/603.14 |
| 6,081,408 | A | 6/2000 | Partee | 360/113 |
| 6,091,581 | A | 7/2000 | Gray et al. | 360/126 |
| 6,198,600 | B1 | 3/2001 | Kitao et al. | 360/235.2 |
| 6,226,149 | B1 | 5/2001 | Dill, Jr. et al. | 360/126 |
| 6,282,056 | B1 | 8/2001 | Feng et al. | 360/126 |
| 6,445,536 | B1 * | 9/2002 | Rudy et al. | 360/126 |
| 6,564,445 | B1 * | 5/2003 | Hashimoto et al. | 29/603.14 |
| 6,635,184 | B1 * | 10/2003 | Cohen et al. | 216/22 |
| 6,751,846 | B2 * | 6/2004 | Hashimoto et al. | 29/603.14 |
| 6,885,520 | B2 * | 4/2005 | Fievre et al. | 360/126 |
| 2002/0039254 | A1 | 4/2002 | Taguchi et al. | 360/125 |
| 2002/0080525 | A1 | 6/2002 | Sato et al. | 360/126 |
| 2002/0141111 | A1 | 10/2002 | Batra et al. | 360/125 |
| 2003/0076625 | A1 * | 4/2003 | Fievre et al. | 360/122 |
| 2003/0188422 | A1 * | 10/2003 | Hashimoto et al. | 29/603.14 |
| 2004/0150910 | A1 * | 8/2004 | Okada et al. | 360/125 |

FOREIGN PATENT DOCUMENTS

JP 11273026 10/1999

OTHER PUBLICATIONS

Hsiao, R., "Fabrication of Magnetic Recording Heads and Dry Etching of Head Materials," IBM Journal of Research and Development, vol. 43, ½, 1999.

* cited by examiner

*Primary Examiner*—William J Klimowicz
(74) *Attorney, Agent, or Firm*—Zilka-Kotab, PC

(57) ABSTRACT

A method for manufacturing a pole tip structure for a magnetic head is provided. An etch stop layer is initially deposited after which a transfer layer is deposited. Further deposited is at least one masking layer. Reactive ion etching is then performed to define a trench in at least the transfer layer. A pole tip layer is then deposited in the trench to define a pole tip structure flanked at least in part by the transfer layer. A surface of the transfer layer or etch stop layer then remains in co-planar relationship with a surface of the pole tip structure.

31 Claims, 9 Drawing Sheets

PLANARIZED PERPENDICULAR POLE TIP SYSTEM AND METHOD FOR MANUFACTURING THE SAME

FIELD OF THE INVENTION

The present invention relates to memory storage devices, and more particularly, this invention relates to improving the fabrication of magnetic head pole tip structures.

BACKGROUND OF THE INVENTION

Computer systems generally utilize auxiliary memory storage devices having media on which data can be written and from which data can be read for later use. A direct access storage device (disk drive) incorporating rotating magnetic disks is commonly used for storing data in magnetic form on the disk surfaces. Data is recorded on concentric, radially spaced tracks on the disk surfaces. Magnetic heads are then used to read data from the tracks on the disk surfaces.

Figure 1:
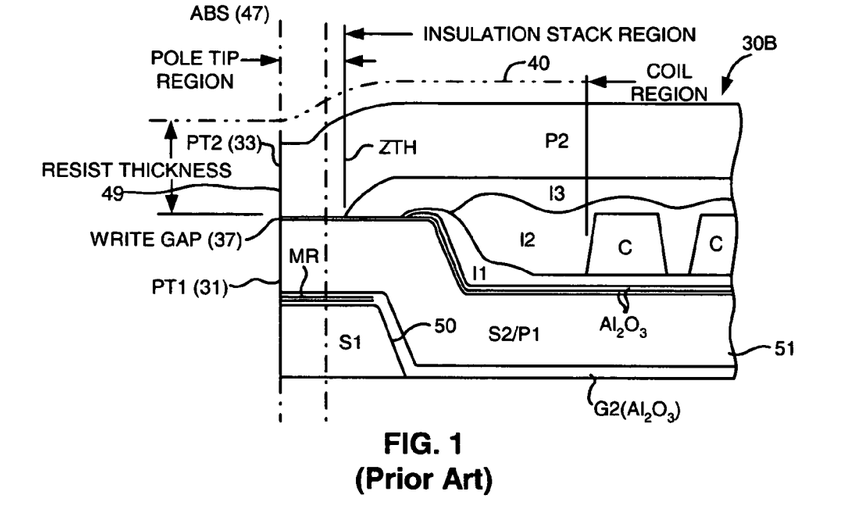
FIGS. 1, 2A and 2B illustrate a pole tip structure system and method of manufacturing the same, in accordance with the prior art.

FIG. 1 illustrates a prior art MR head, which may be employed as a magnetic head on a slider. The head 30B has a pole tip region 49, an insulation stack region and a coil region, the pole tip region 49 extending from the ABS 47 to the insulation stack region, the insulation stack region extending from the pole tip region 49 to the back gap (not shown) and the coil region located in the insulation stack region but spaced from the pole tip region 49. In the present framework, the first and second shield layers S1 and S2 are located in the pole tip region 49 for the protection of the MR sensor. The first shield S1 terminates between the pole tip region 49 and the coil region along a slope 50. This provides a sunken or depressed area 51 for subsequent thin film layers of the head which makeup the insulation stack. The second gap layer G2 extends along the slope 50 of the first shield S1, thence perpendicular to the ABS 47 toward a back region of the head. It should be noted that leads are not shown following the same path. The leads for the head 30B may take a different path.

The layer S2/P1, write gap, insulation layer I1, write coil, insulation layers I2 and I3, and the second pole piece P2 are all recessed by the depression provided by the first shield layer S1 in the insulation stack region lowering the height of the second pole piece P2 above the write gap plane so as to enhance planarization of the second pole tip PT2 33. This significantly increases the lithographic process window needed for the fabrication of the pole tip PT2. A thinner resist layer permits a narrower pole tip to be precisely constructed with good definition, thereby enhancing the bit density of the head.

The slope 50 of the first shield S1 may be constructed by a resist layer with a negative slope. Permalloy may then be plated adjacent the negative slope, after which the resist is removed to produce the slope 50 of the first shield S1.

To further generalize the structure of the MR head, the ferromagnetic layers that are S2/P1 may be separate layers. In addition, different layers in the head may be planarized [e.g. via chemical mechanical polishing or (CMP)] to increase a fabrication process window for the various parts of the head.

In the case where the write head was a perpendicular write head, one pole tip (e.g. PT2 33) would have a much smaller cross-section at the ABS 47 plane compared to the other pole tip (e.g. PT1 31). The write gap 37 may also vary.

Figure 2A:
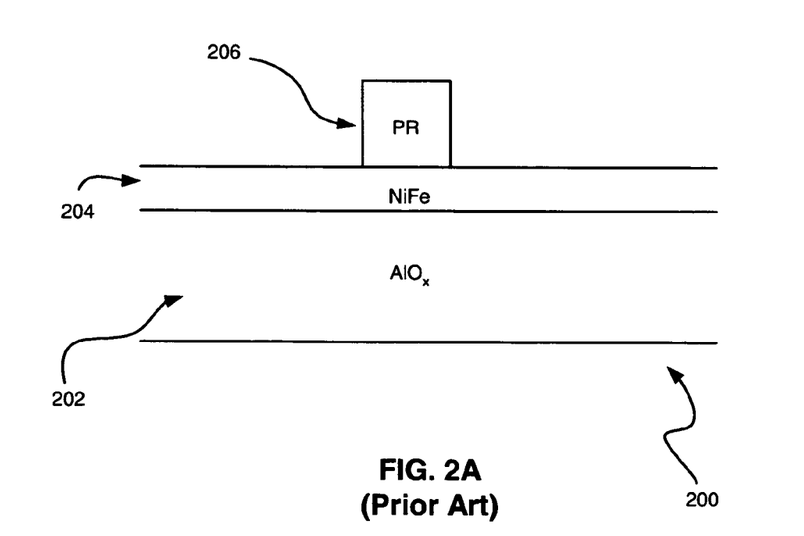
Figure 2B:
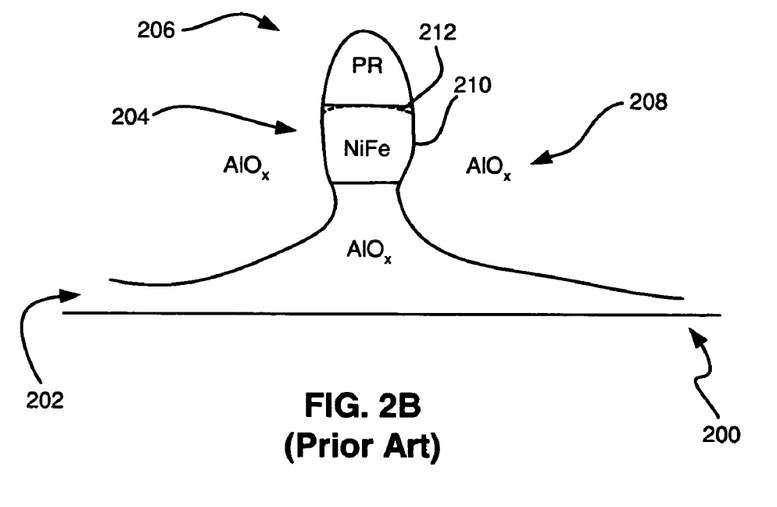

FIGS. 2A-2B illustrate a method of manufacturing the pole tip structure associated with a magnetic head, such as that shown in FIG. 1. See second pole piece P2 of FIG. 1, for example.

FIG. 2A illustrates a cross-sectional view of an initial stack 200 with which a prior art pole tip structure may be manufactured. As shown, the stack 200 includes a first layer 202 which may include $AlO_x$ or some other non-magnetic material. Deposited above the first layer 202 is a second layer 204 including, for example, NiFe or a material which substantially consists of a ferromagnetic material. A masking third layer 206 is deposited above the second layer 204. The third layer 206 may include a masked photoresist which is used to define a pole tip structure as will soon become apparent.

FIG. 2B illustrates another cross-sectional view of the stack 200 of FIG. 2 after various processes. In particular, the second layer 204 and a portion of the first layer 202 may be removed utilizing an ion milling process. As a result of the foregoing process, a pole tip structure 210 is defined with a pair of cavities flanking the same. Thereafter, additional $AlO_x$ material 208 or similar material is used to fill the cavities.

It is often advantageous to have a pole tip structure 210 with beveled edges such as that shown in FIG. 2B. It is also desirable to generate a pole tip structure that is rectangular with a low aspect ratio or similar height to width ratio as viewed at the cross-section at the ABS 47 plane. Moreover, it is desirable that a top edge of the pole tip structure 210 be planar in nature. Unfortunately, the top edge of the pole tip structure 210 may lose its planarity and exhibit a rounding effect (see 212 of FIG. 2B) as a result of subsequent processes unless specific process steps are taken to maintain pole definition and function.

DISCLOSURE OF THE INVENTION

A method for manufacturing a pole tip structure for a magnetic head is provided. An etch stop layer is initially deposited after which a transfer layer is deposited. Further deposited is at least one masking layer. Reactive ion etching is then performed to define a trench in at least the transfer layer. A pole tip layer is then deposited in the trench to define a pole tip structure flanked at least in part by the transfer layer. A surface of the transfer layer or etch stop layer then remains in co-planar relationship with a surface of the pole tip structure.

In one embodiment, the etch stop layer may include an alumina material. Moreover, the etch stop layer may be deposited utilizing a sputtering operation. As an option, a chemical-mechanical planarization (CMP) operation may be performed on the etch stop layer.

In another embodiment, the transfer layer may include a silica material. Also, an adhesion layer may be deposited above the transfer layer. Optionally, the adhesion layer may include silicon.

In still another embodiment, a chemical mechanical polishing (CMP) stop layer may be positioned above the adhesion layer. Optionally, the CMP stop layer may include a diamond-like carbon material. As a further option, another transfer layer (i.e. silicon) may be deposited above the CMP stop layer.

As an option, the pole tip layer may include a CoFe material, a NiFe material, an alloy thereof, etc. Moreover, the pole tip layer may be deposited utilizing ion beam deposition, sputtering, etc.

In still another embodiment, an adhesion layer may be deposited above the pole tip layer. Such adhesion layer may optionally include silicon. Still yet, a chemical mechanical polishing (CMP) stop layer may be deposited above the adhesion layer, and a capping layer may be deposited above the CMP stop layer. Such CMP stop layer may include a diamond-like carbon material. A CMP operation may then be performed on the capping layer, such that it remains only over the pole tip structure after the CMP operation. A reactive ion etching operation may then be performed to remove the CMP stop layer surrounding the pole tip structure. Moreover, another CMP operation may subsequently be performed on a remaining portion of the pole tip layer surrounding the pole tip structure. A reactive ion etching operation may then be performed on a remaining portion of the CMP stop layer situated above the pole tip structure. A polishing operation may thus be performed on a remaining portion of the pole tip layer situated above the transfer layer.

BRIEF DESCRIPTION OF THE DRAWINGS

For a fuller understanding of the nature and advantages of the present invention, as well as the preferred mode of use, reference should be made to the following detailed description read in conjunction with the accompanying drawings which are not necessarily drawn to scale.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 3:
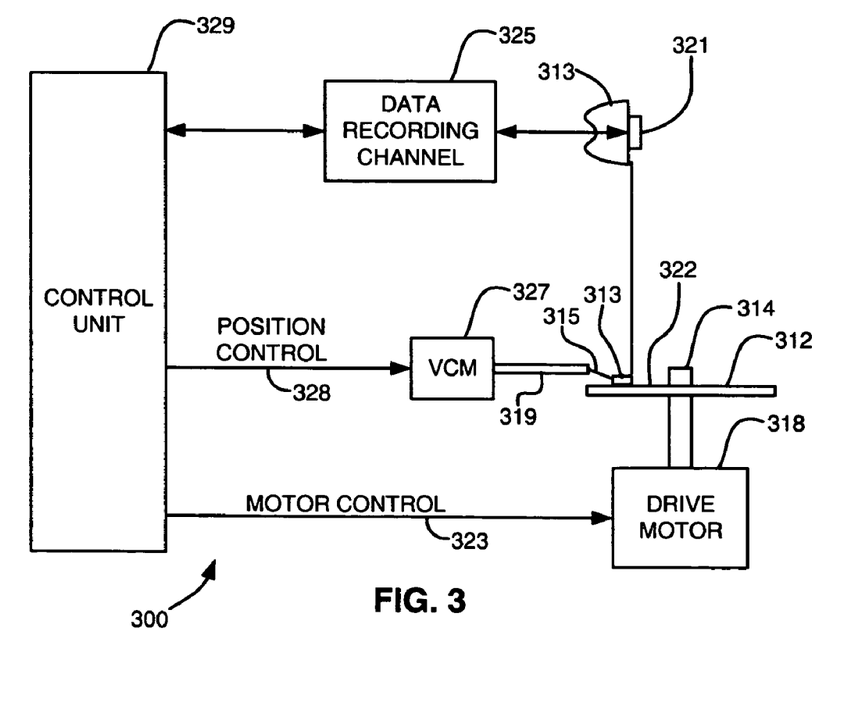
FIG. 3 is a perspective drawing of a magnetic recording disk drive system in accordance with one embodiment of the present invention.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording media on each disk is in the form of an annular pattern of concentric data tracks (not shown) on disk 312.

At least one slider 313 is positioned on the disk 312, each slider 313 supporting one or more magnetic read/write heads 321. More information regarding such heads 321 will be set forth hereinafter during reference to FIG. 4. As the disks rotate, slider 313 is moved radially in and out over disk surface 322 so that heads 321 may access different portions of the disk where desired data are recorded. Each slider 313 is attached to an actuator arm 319 by way of a suspension 315. The suspension 315 provides a slight spring force which biases slider 313 against the disk surface 322. Each actuator arm 319 is attached to an actuator 327. The actuator 327 as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 and disk surface 322 which exerts a force on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by way of recording channel 325.

The above description of a magnetic disk storage system, and the accompanying illustration of FIG. 3 are for representation purposes only. It should be apparent that disk storage systems may contain a large number of disks and actuators, and each actuator may support a number of sliders.

Figure 4:
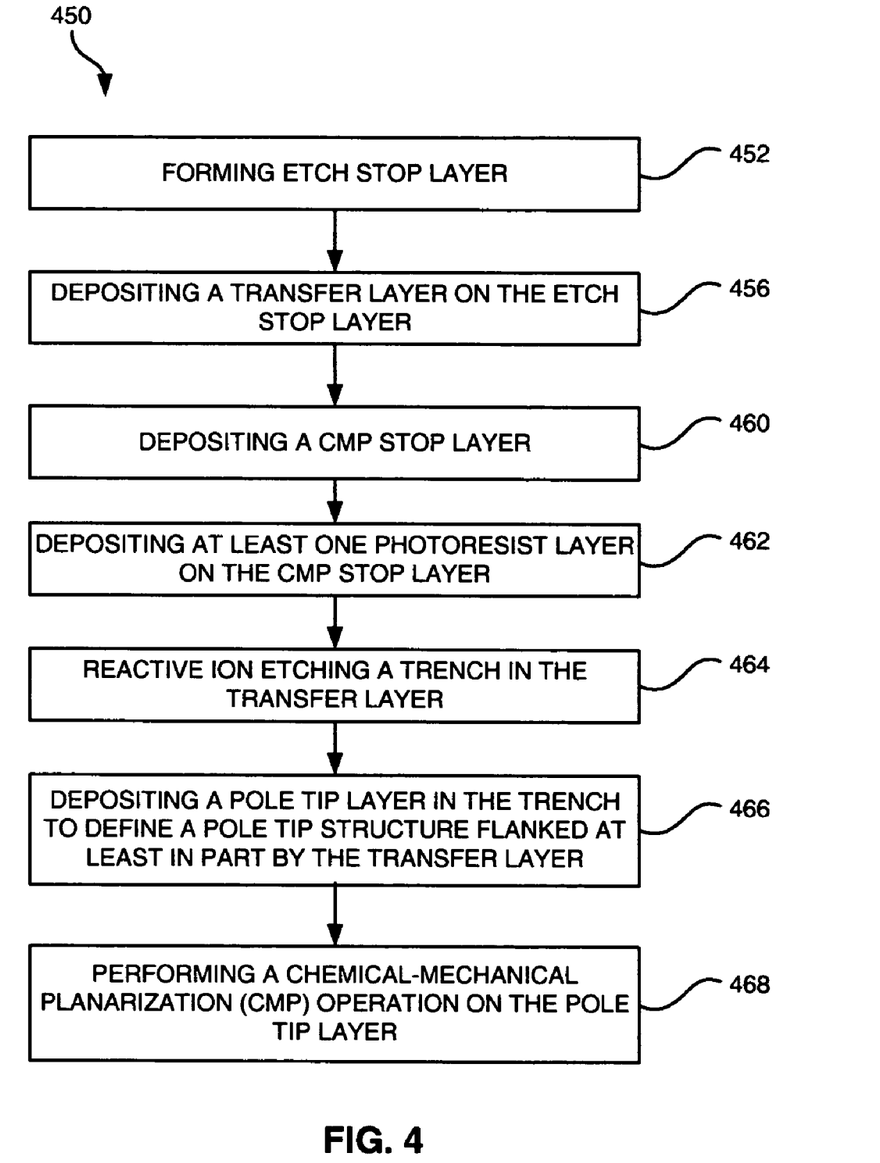
FIG. 4 illustrates a process for manufacturing a pole tip structure for a magnetic head, in accordance with one embodiment.

FIG. 4 illustrates a method 450 for manufacturing a pole tip structure for a magnetic head, in accordance with one embodiment. In one embodiment, the method of FIG. 4 may be used in the context of the head 321 of FIG. 3. Of course, the method 450 may be implemented in any desired context.

In operation 452, an etch stop layer is formed. As an option, the etch stop layer may include an alumina material, insulator-type material, or any other desired material capable of stopping a subsequent etching operation. Moreover, the etch stop layer may be deposited utilizing a sputtering operation or the like. This etch stop may also be planarized.

A planarization stop layer [i.e. chemical mechanical polishing (CMP) stop layer] may be deposited, in accordance with operation 460. Such optional CMP stop layer may include a diamond-like carbon (DLC) material or any other type of CMP stop material (i.e. C, SiN$_x$, Ta, Ti, an alloy thereof, etc.). The CMP stop layer may also include adhesion layers. The adhesion layer material may be selected from the group consisting of Si, Ta, Cr, Ti, an alloy thereof, etc.

Next, in operation 462, at least one photoresist layer (possibly multiple) is deposited above the CMP stop layer. In one embodiment, 0.2 um of photoresist may be deposited. Of course, if the CMP layer and/or adhesion layer are optionally excluded, such photoresist layer may be deposited on the transfer layer. Thus, in the context of the present description, the term above may refer to any spaced (i.e. with another material therebetween) or contiguous relationship between layers.

In operation 464, reactive ion etching may be used to create a trench in the CMP stop layer (if it exists), the adhesion layer (if it exists), and the transfer layer. Such reactive ion etching may further be performed such that not all of the photoresist is consumed. The remaining photoresist may be removed by any well known processes.

A pole tip layer may then be deposited in the trench to define a pole tip structure flanked at least in part by the transfer layer, as noted in operation 466. In one embodiment, the pole tip structure may be constructed using NiFe, CoFe or any other desired suitable pole tip material. Moreover, the pole tip layer may be deposited utilizing ion beam deposition, sputtering, electroplating, etc. As an option, another adhesion layer may be deposited prior to the deposition of the pole tip layer material. Thereafter, in operation 468, a chemical-mechanical planarization (CMP) operation is performed to remove excess portions of the pole tip layer.

Of course, any other desired operations may be subsequently applied. For example, the resultant pole tip structure may be encapsulated in an insulator (i.e. silica, alumina, etc.) to protect the pole tip structure, etc. for subsequent processing.

Thus, by the present method, there is no need for the fill-in procedure shown in Prior Art FIG. 2B and, more importantly, there is less damage inflicted on the pole tip structure. This is manifested by a surface (i.e. upper and/or lower surface) of the transfer layer remaining in co-planar relationship with a surface (i.e. upper and/or lower surface, respectively) of the pole tip structure. More information regarding the present design will be set forth in greater detail during reference to FIGS. 5A-5D. Moreover, various optional alternative embodiments will be set forth during reference to FIGS. 6A-6F, and FIGS. 7-8.

FIGS. 5A-5D illustrate various exemplary structural embodiments that may result from the method 450 of FIG. 4. While the following descriptions will be set forth in the context of the various operations of the method 450 of FIG. 4, it should be noted that the various operations and structural features may be implemented in any desired context.

Figure 5A:
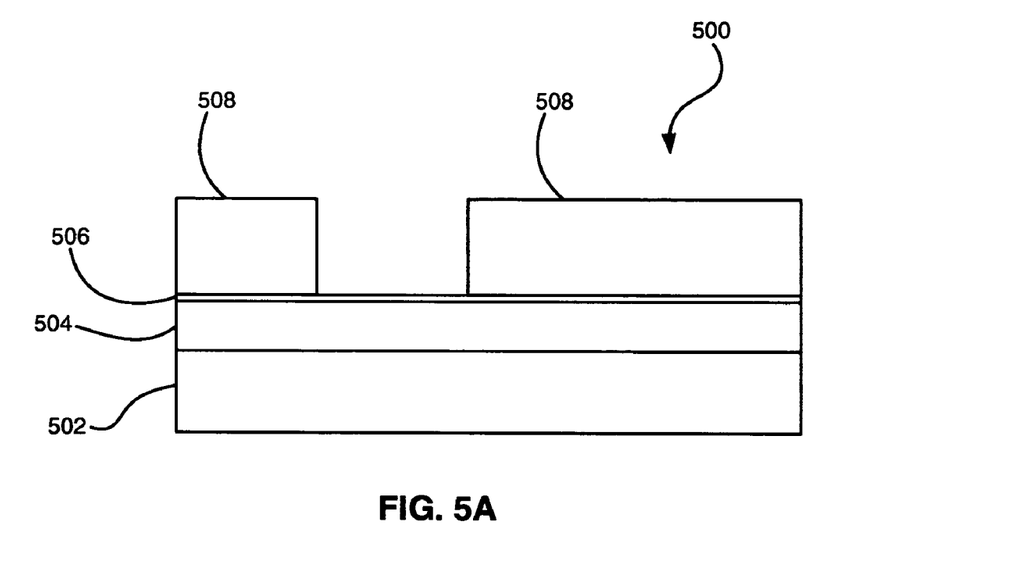
FIG. 5A illustrates a stack of various layers present after the initial operations of the method of FIG. 4.

FIG. 5A illustrates a stack 500 of various layers present after initial operations 452-462 of the method 450 of FIG. 4. As shown, an etch stop layer 502 is shown deposited with the transfer layer 504 and the CMP stop/adhesion layer 506 positioned thereon. Further deposited on such layers is a photoresist layer 508. The present stack 500 is thus ready for the reactive ion etching of operation 464 of the method 450 of FIG. 4.

Figure 5B:
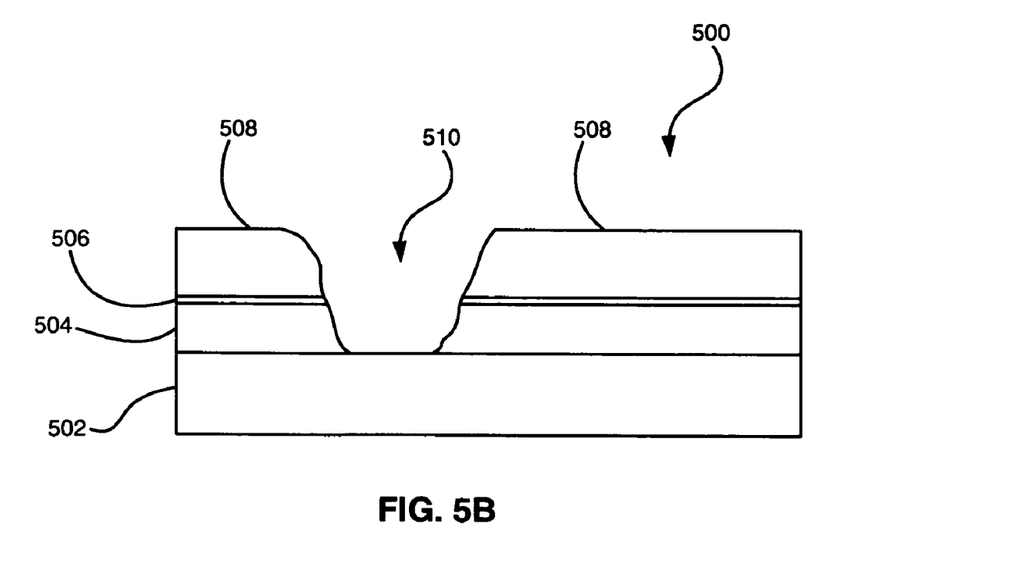
FIG. 5B illustrates a stack of various layers present after the reactive ion etching operation of the method of FIG. 4.

FIG. 5B illustrates a stack 500 of various layers present after the reactive ion etching operation 464 of the method 450 of FIG. 4. As shown, the reactive ion etching creates a trench 510 through the transfer layer 504 and the CMP stop/adhesion layer 506 (if it exists). Such trench 510 terminates at an upper surface of the etch stop layer 502.

Figure 5C:
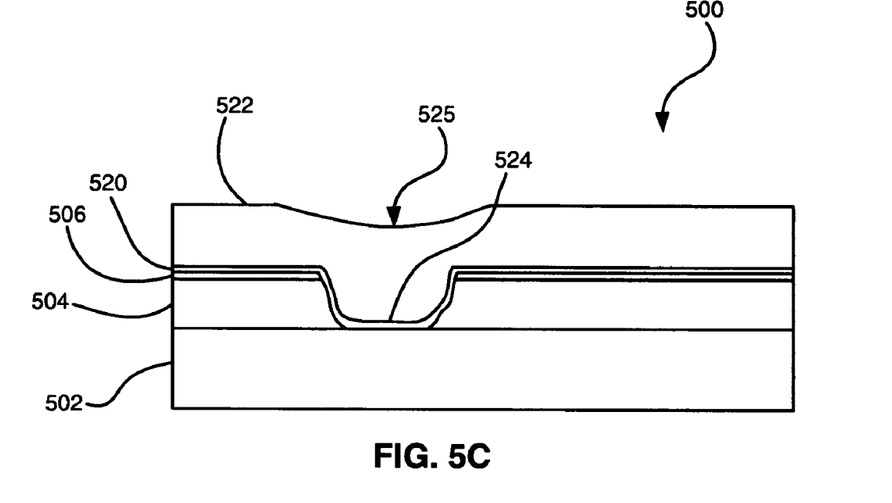
FIG. 5C illustrates a stack of various layers present after the pole tip layer is deposited in accordance with the method of FIG. 4.

FIG. 5C illustrates a stack 500 of various layers present after the pole tip layer is deposited in accordance with operation 466 of the method 450 of FIG. 4. As shown, any remaining photoresist masking layer 508 may be removed, and the trench 510 filled with the pole tip layer material 522. As mentioned earlier, another adhesion layer 524 may be deposited prior to the deposition of the pole tip layer material. As shown, a slight depression 525 exists above where the trench 510 resides.

In the event the masking layer 508 is not removed before pole tip deposition, the pole tip layer material 522 will subsequently cover the masking layer 508. The masking layer 508 would be removed during a planarization process.

Figure 5D:
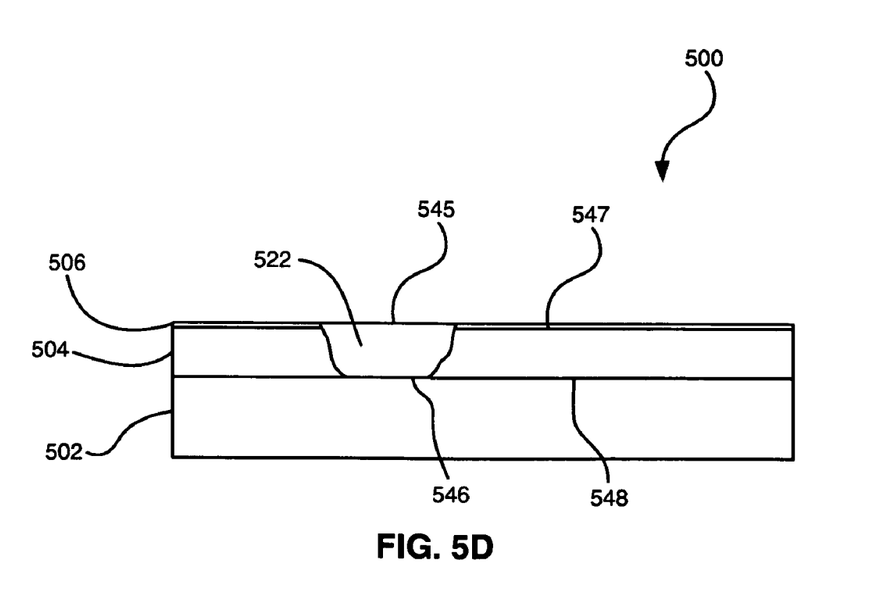
FIGS. 5D and 5E each illustrate a stack of various layers present after the pole tip layer is planarized in accordance with the method of FIG. 4.

FIG. 5D illustrates a stack 500 of various layers present after the pole tip layer is planarized in accordance with operation 468 of the method 450 of FIG. 4. Again, there is no need for the fill-in procedure shown in Prior Art FIG. 2B and, more importantly, there is less damage inflicted on the pole tip structure.

As shown in FIG. 5D, the transfer layer 504 is in co-planar relationship with the pole tip structure and is discontinuous from the layers above (see CMP stop/adhesion layer 506) and below (see etch stop layer 502) the pole tip layer 522. In other words, the transfer layer 504 has a height (i.e. thickness) substantially similar to that of the portion of the pole tip layer 522 defining the pole tip structure. Moreover, such transfer layer 504 is etchable.

To this end, a surface (i.e. an upper surface 547 and/or a lower surface 548) of the transfer layer 504 remains in co-planar relationship with a surface (i.e. an upper surface 545 and/or a lower surface 546), respectively, of the pole tip structure. Thus, the use of the transfer layer 504 (with optional overlying CMP stop layer) allows for greater control of the bevel angles of the resultant pole tip structure, since the material of such transfer layer 504 may be different from the underlying etch stop layer 502. Moreover, the processing difficulties of image transfer milling into a pole tip material (i.e. NiFe, etc.) is avoided to create a trench 510 with a relatively low aspect ratio.

Figure 5E:
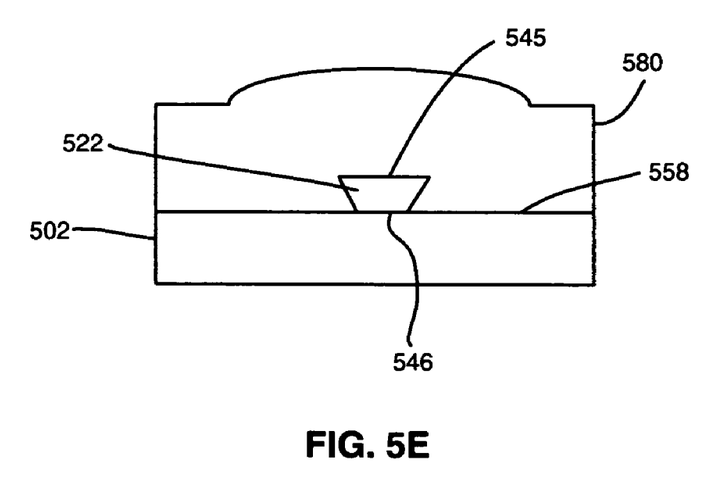

Similarly, if the transfer layer 504 is removed (e.g. via etching) and replaced with a fill material 580, the pole tip layer 522 is not be adjacent to the transfer layer 504. However, due to the planarization process, at least one of the surfaces of the pole tip layer 522 (i.e. coincident with the bottom surface of the pole tip 546) is co-planar with a top surface 558 of the etch stop layer 502. The fill material 580 may or may not be similar to the etch stop layer 502. This structure is shown in FIG. 5E. It is also noteworthy to add that either a pole tip top surface 545 and/or bottom surface 546 may be flat, in one embodiment. This flatness may determine the shape of magnetic bits written along a track on the media.

Figure 6A:
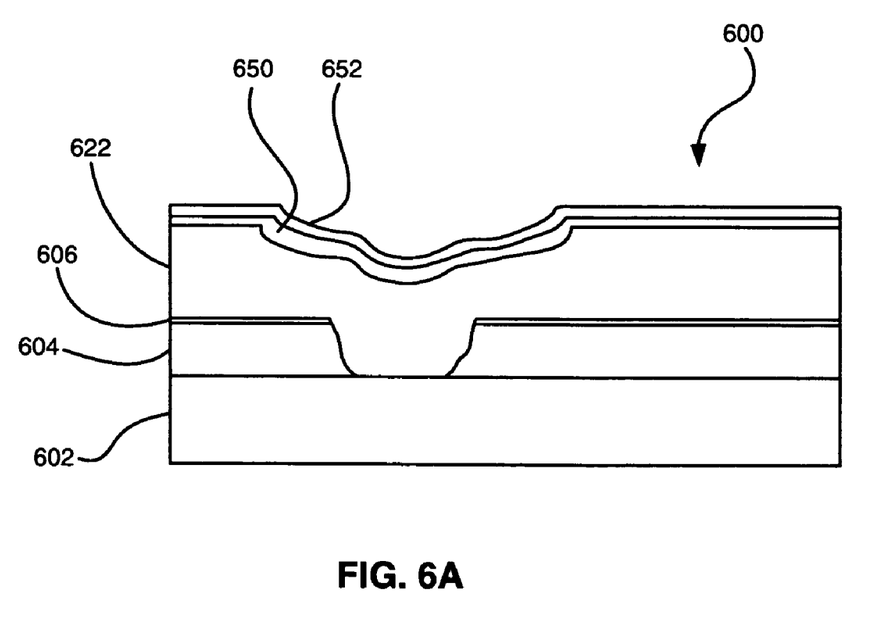
FIG. 6A illustrates a stack of various layers present after the pole tip layer is deposited in accordance with the method of FIG. 4, in addition to some optional layers which may be deposited in accordance with an alternate embodiment.

FIG. 6A illustrates a stack 600 of various layers present after the pole tip layer is deposited in accordance with operations 452-466 of the method 450 of FIG. 4, in addition to some optional layers which may be deposited in accordance with an alternate embodiment. The purpose of an alternate method is to create a structure at the pole tip location that protrudes from the wafer plane. This protruding topography creates a structure that can be quickly planarized. Ideally, one wants to create a pole tip with a flat surface with an acceptable planarization process window. Such protruding structures are thus planarized quickly where planarizing flat portions of the wafer greatly reduces the removal rate or reduction of the thickness of the pole.

As shown, an etch stop layer 602 is shown deposited with the transfer layer 604 and the CMP stop/adhesion layer 606 positioned thereon, which have all been subject to the reactive ion etching of operation 464 of the method 450 of FIG. 4. As shown, any remaining photoresist layer may be removed, and the trench filled with the pole tip layer material 622.

Moreover, another CMP stop/adhesion layer 650 may be deposited on the pole tip layer 622. Still yet, a capping layer 652 may be deposited on the CMP stop/adhesion layer 650. As will soon become apparent, such capping layer 652 may serve to protect the pole tip structure.

Figure 6B:
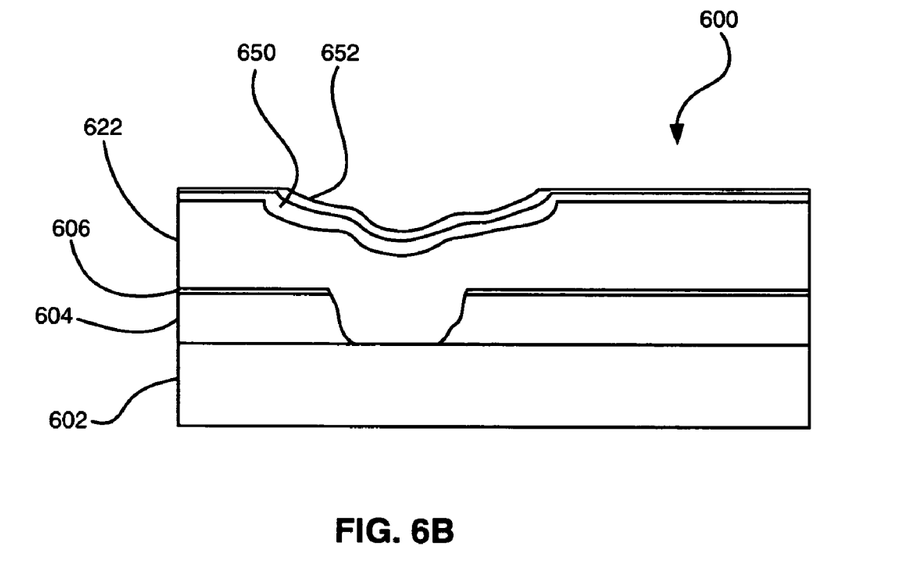
FIG. 6B illustrates a stack of various layers present after an optional chemical mechanical polishing (CMP) operation is performed on the stack shown in FIG. 6A.

FIG. 6B illustrates a stack 600 of various layers present after an optional CMP operation is performed on the stack 600 shown in FIG. 6A. As shown, the portions of the capping layer 652 positioned over the area surrounding the pole tip structure are significantly removed, while a portion situated over the pole tip structure remains after the CMP operation.

Figure 6C:
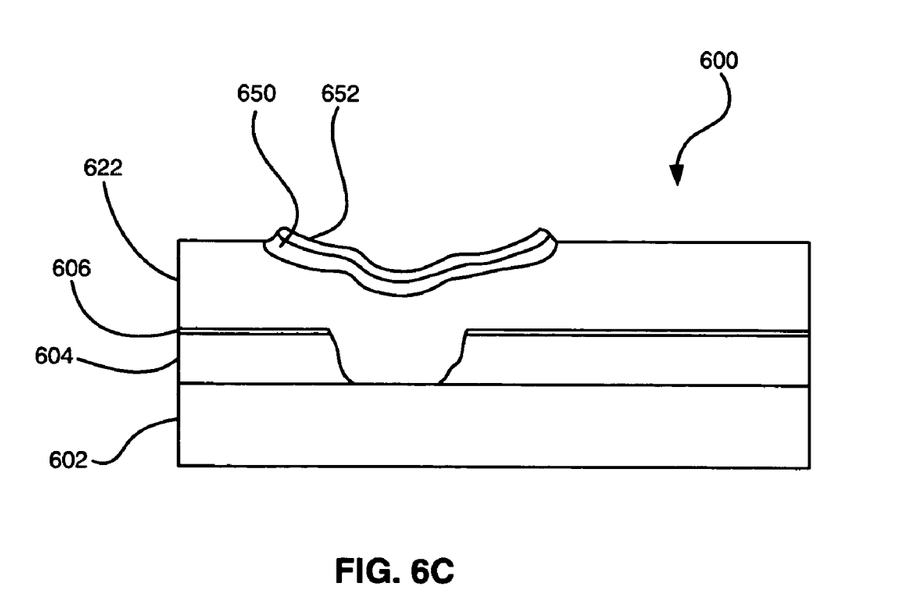
FIG. 6C illustrates a stack of various layers present after a reactive ion etching operation is performed on the stack shown in FIG. 6B.

FIG. 6C illustrates a stack 600 of various layers present after a reactive ion etching operation is performed on the stack 600 shown in FIG. 6B. As shown, such reactive ion etching operation may be performed to remove the CMP stop/adhesion layer 650 surrounding the pole tip structure. As shown, the capping layer 652 and CMP stop/adhesion layer 650 remain on an area over the pole tip structure (i.e. in the slight depression).

Figure 6D:
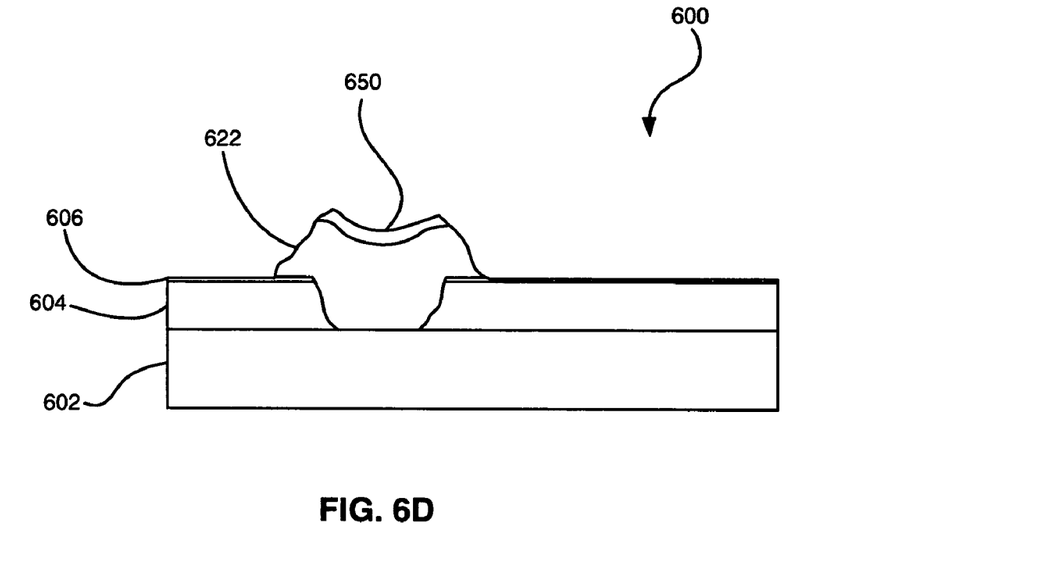
FIG. 6D illustrates a stack of various layers present after another CMP operation is performed on the stack shown in FIG. 6C.

FIG. 6D illustrates a stack 600 of various layers present after another CMP operation is performed on the stack 600 shown in FIG. 6C. As shown, the remaining portion of the pole tip layer 622 surrounding the pole tip structure is removed, leaving the mound of the pole tip layer 622 with a portion of the CMP stop/adhesion layer 650 thereon.

Figure 6E:
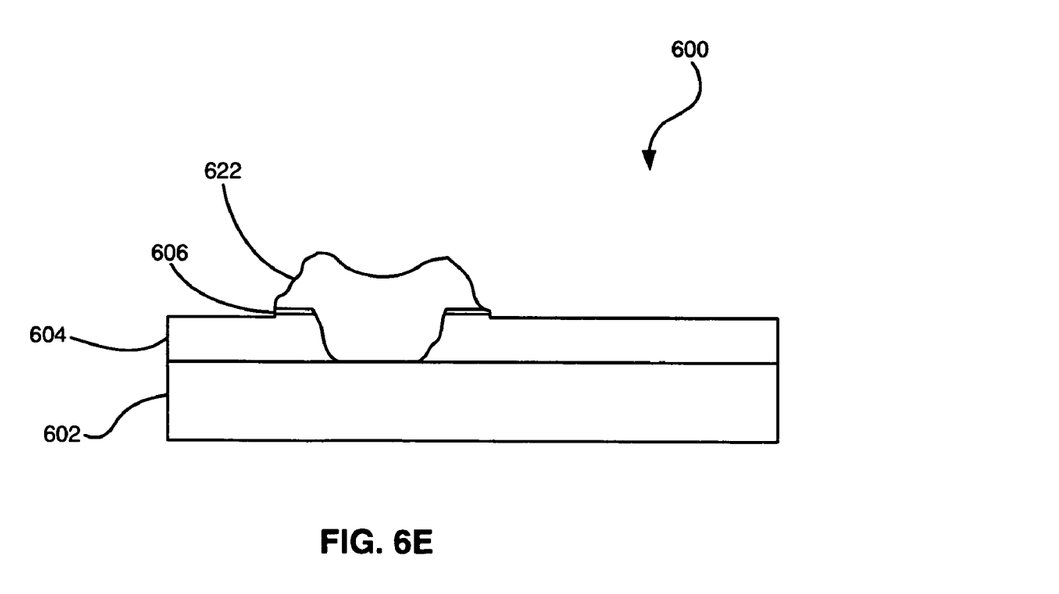
FIG. 6E illustrates a stack of various layers present after another reactive ion etching operation is performed on the stack shown in FIG. 6D.

FIG. 6E illustrates a stack 600 of various layers present after another reactive ion etching operation is performed on the stack 600 shown in FIG. 6D. As shown, the reactive ion etching operation may be performed on a remaining portion of the CMP stop/adhesion layer 650 situated above the pole tip structure.

Figure 6F:
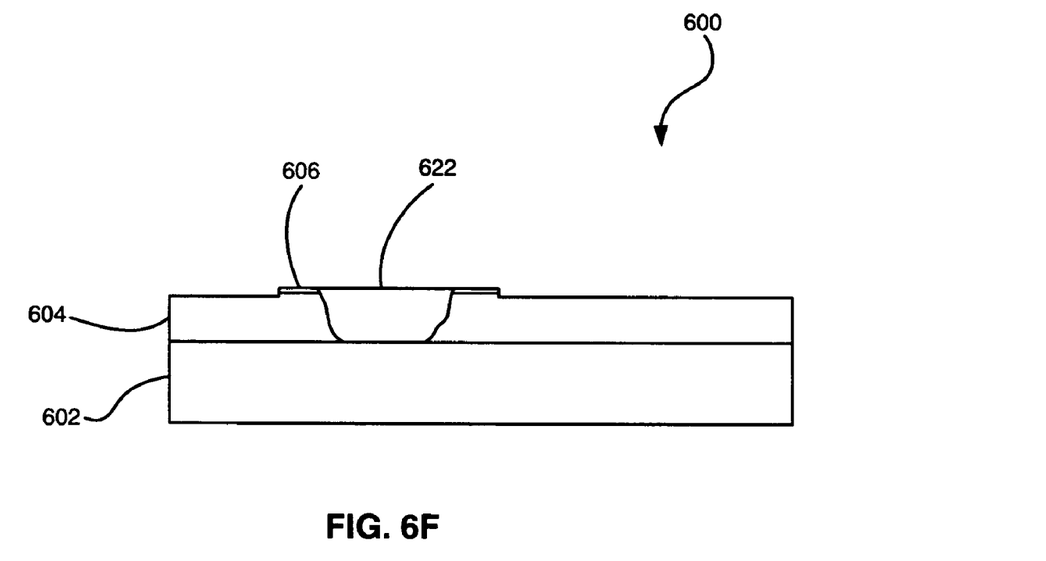
FIG. 6F illustrates a stack of various layers present after a polishing operation is performed on the stack shown in FIG. 6D.

FIG. 6F illustrates a stack 600 of various layers present after a polishing operation is performed on the stack 600 shown in FIG. 6D. As shown, the polishing operation may be performed on a remaining portion of the pole tip layer situated above the transfer layer. Again, a surface (i.e. an upper surface and/or a lower surface) of the transfer layer remains in co-planar relationship with a surface (i.e. an upper surface and/or a lower surface), respectively, of the pole tip structure.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic head, comprising:
an etch stop layer;
a transfer layer positioned above the etch stop layer with a trench formed therein, walls of the trench tapering together towards the etch stop layer; and
a pole tip layer situated in the trench to define a pole tip structure flanked at least in part by the transfer layer;
wherein at least one of an upper surface and a lower surface of at least one of the etch stop layer and the transfer layer remains in co-planar relationship with at least one of an upper surface and a lower surface of the pole tip structure,
wherein a continuously planar portion of the etch stop layer is coextensive with and extends beyond the at least one of the upper surface and a lower surface of the pole tip structure in a direction parallel to a plane of deposition of the etch stop layer and parallel to an air bearing surface of the head.

2. The magnetic head as recited in claim 1, further comprising a planarization stop layer deposited above the transfer layer, wherein an upper surface of the pole tip structure is about coplanar with the planarization stop layer.

3. The magnetic head as recited in claim 1, wherein the pole tip layer includes a ferromagnetic material.

4. The magnetic head as recited in claim 1, wherein the pole tip layer includes a material selected from the group consisting of NiFe and CoFe.

5. The magnetic head as recited in claim 1, wherein the pole tip layer is deposited utilizing at least one of ion beam deposition, sputtering, and electroplating.

6. The magnetic head as recited in claim 1, wherein an upper surface of the pole tip layer is located above a plane of the upper surface of the transfer layer.

7. The magnetic head as recited in claim 1, wherein an adhesion layer is deposited above the pole tip layer.

8. The magnetic head as recited in claim 7, wherein the adhesion layer includes a material selected from the group consisting of Si, Ta, Cr, and Ti.

9. The magnetic head as recited in claim 7, wherein a planarization stop layer is deposited above the adhesion layer.

10. The magnetic head as recited in claim 9, wherein the planarization stop layer includes a material selected from the group consisting of C, $SiN_x$, Ta, and Ti.

11. The magnetic head as recited in claim 9, wherein a capping layer is deposited above the planarization stop layer.

12. The magnetic head as recited in claim 11, wherein a planarization operation is performed on the capping layer.

13. The magnetic head as recited in claim 12, wherein the capping layer remains over the pole tip structure after the planarization operation.

14. The magnetic head as recited in claim 13, wherein a reactive ion etching operation is performed to remove the planarization stop layer surrounding the pole tip structure.

15. The magnetic head as recited in claim 14, wherein another planarization operation is performed on a remaining portion of the pole tip layer surrounding the pole tip structure.

16. The magnetic head as recited in claim 15, wherein another reactive ion etching operation is performed on a remaining portion of the planarization stop layer situated above the pole tip structure.

17. The magnetic head as recited in claim 16, wherein a planarization operation is performed on a remaining portion of the pole tip layer situated above the transfer layer.

18. A magnetic head, comprising:
an etch stop layer; and
a pole situated on top of the etch stop layer, walls of a portion of the pole tapering together towards the etch stop layer;
wherein at least one of an upper surface and a lower surface of the etch stop layer remains in co-planar relationship with at least one of an upper surface and a lower surface of the portion of the pole, wherein a continuously planar portion of the etch stop layer is coextensive with and extends beyond the at least one of the upper surface and a lower surface of the portion of the pole in a direction parallel to a plane of deposition of the etch stop layer and parallel to an air bearing surface of the head.

19. The magnetic head as recited in claim 18, wherein the etch stop layer includes a non-magnetic material.

20. The magnetic head as recited in claim 18, wherein the etch stop layer includes an insulator.

21. The magnetic head as recited in claim 18, wherein the etch stop layer is deposited utilizing a sputtering operation.

22. The magnetic head as recited in claim 18, wherein a planarization operation is performed on the etch stop layer.

23. The magnetic head as recited in claim 18, further comprising a transfer layer positioned above the etch stop layer with a trench formed therein, wherein the transfer layer includes a material capable of being ion-etched.

24. The magnetic head as recited in claim 18, further comprising a transfer layer positioned above the etch stop layer with a trench formed therein, wherein an adhesion layer is deposited above the transfer layer.

25. The magnetic head as recited in claim 24, wherein the adhesion layer includes a material selected from the group consisting of Si, Ta, Cr, and Ti.

26. The magnetic head as recited in claim 18, further comprising a transfer layer located along the walls of the portion of the pole, and further comprising a planarization stop layer deposited above the transfer layer, wherein an upper surface of the portion of the pole is about coplanar with the planarization stop layer.

27. The magnetic head as recited in claim 26, wherein the planarization stop layer includes a material selected from the group consisting of C, $SiN_x$, Ta, and Ti.

28. The magnetic head as recited in claim 26, wherein a transfer layer is deposited above the planarization stop layer.

29. The magnetic head as recited in claim 18, further comprising a transfer layer positioned above the etch stop layer with a trench formed therein, wherein the upper surface of the pole is located above a plane of the upper surface of the transfer layer.

30. A disk drive system, comprising:
a magnetic recording disk;
a magnetic head including:
    an etch stop layer, and
    a pole situated on top of the etch stop layer, walls of a portion of the pole tapering together towards the etch stop layer,
    wherein at least one of an upper surface and a lower surface of the etch stop layer remains in co-planar relationship with at least one of an upper surface and a lower surface of the portion of the pole,
    wherein a continuously planar portion of the etch stop layer is coextensive with and extends beyond the at least one of the upper surface and a lower surface of the portion of the pole in a direction parallel to a plane of deposition of the etch stop layer and parallel to an air bearing surface of the head;
an actuator for moving the magnetic head across the magnetic recording disk so the magnetic head may access different regions of the magnetic recording disk; and
a controller electrically coupled to the magnetic head.

31. A disk drive system, comprising:
a magnetic recording disk;
a magnetic head including:
    an etch stop layer,
    a transfer layer positioned above the etch stop layer with a trench formed therein, walls of the trench tapering together towards the etch stop layer, and
    a pole tip layer situated in the trench to define a pole tip structure flanked at least in part by the transfer layer,
    wherein at least one of an upper surface and a lower surface of at least one of the etch stop layer and the transfer layer remains in co-planar relationship with at least one of an upper surface and a lower surface of the pole tip structure,
    wherein a continuously planar portion of the etch stop layer is coextensive with and extends beyond the at least one of the upper surface and a lower surface of the portion of the pole in a direction parallel to a plane of deposition of the etch stop layer and parallel to an air bearing surface of the head;
an actuator for moving the magnetic head across the magnetic recording disk so the magnetic head nay access different regions of the magnetic recording disk; and
a controller electrically coupled to the magnetic head.

* * * * *

UNITED STATES PATENT AND TRADEMARK OFFICE
CERTIFICATE OF CORRECTION

PATENT NO. : 7,248,434 B2  Page 1 of 1
APPLICATION NO. : 10/798163
DATED : July 24, 2007
INVENTOR(S) : Dill et al.

It is certified that error appears in the above-identified patent and that said Letters Patent is hereby corrected as shown below:

In the claims:
col. 10 line 44 change "nay" to --may--.

Signed and Sealed this

Sixth Day of November, 2007

JON W. DUDAS
*Director of the United States Patent and Trademark Office*